(12) United States Patent
Canet et al.

(10) Patent No.: US 6,195,913 B1
(45) Date of Patent: Mar. 6, 2001

(54) DRYING TUNNEL APPLICABLE TO FRUIT AND VEGETABLES

(75) Inventors: Jaime-Andras Catala Canet; Jose Catala Canet; Pedro Moreno Barber, all of Valencia (ES)

(73) Assignee: CMC Maquinaria Hortofruiticola, Gandia Valencia (ES)

( * ) Notice: Subject to any disclaimer, the term of this patent is extended or adjusted under 35 U.S.C. 154(b) by 0 days.

(21) Appl. No.: 09/430,579

(22) Filed: Oct. 29, 1999

(51) Int. Cl.$^7$ ....................................................... F26B 17/00
(52) U.S. Cl. .................................. 34/583; 34/589; 34/65; 34/227; 34/236
(58) Field of Search .............................. 34/576, 580, 583, 34/589, 62, 65, 213, 227, 236; 62/57, 374, 332, 380; 426/302, 305, 102

(56) References Cited

U.S. PATENT DOCUMENTS

| | | | |
|---|---|---|---|
| 3,681,851 | * 8/1972 | Fleming | 34/284 |
| 3,807,186 | * 4/1974 | Hardy | 62/57 |
| 4,062,202 | * 12/1977 | Cloudy | 34/164 X |
| 4,632,835 | * 12/1986 | Norris | 426/302 |
| 4,704,804 | * 11/1987 | Wyatt et al. | 34/217 X |
| 5,862,609 | * 1/1999 | Stevens et al. | 34/210 X |
| 5,913,590 | * 6/1999 | Backus | 34/216 X |
| 5,915,815 | * 6/1999 | Moore et al. | 34/169 X |
| 6,068,874 | * 5/2000 | Grocholski | 34/78 X |

* cited by examiner

Primary Examiner—Stephen Gravini
(74) Attorney, Agent, or Firm—Harter, Secrest & Emery LLP; Stephen B. Salai; Brian B. Shaw

(57) ABSTRACT

A drying tunnel applicable to products of fruits and vegetables for drying, using ambient temperature dry air. The tunnel has an outer casing fitted with two independent stories which has openings at the ends of the upper floor, which crossed inside in an upward direction by a conveyor belt which is in turn crossed in a counterflow direction by a particular flow of drying air at ambient temperature. Humidity of the products is absorbed by traveling along the conveyor belt which passes through the upper flow. The upper floor is blown by fans treated by air passing through a refrigeration evaporator, condenser, and compressor located on the upper floor. Air curtains are at the tunnel openings to minimize escaping air. Air filters are included to eliminate suspended particles from the product surface.

1 Claim, 1 Drawing Sheet

DRYING TUNNEL APPLICABLE TO FRUIT AND VEGETABLES

AIM OF THE INVENTION

This descriptive report refers to the application for a Utility Model, as regards an improved drying tunnel applicable to fruit and vegetables, whose utility lies in being a device able to reduce the surface humidity on the skin of said items stemming from the washing process to which said products are normally subjected in order to get rid of any items adhering to these and improve their appearance.

The invention enables the aforementioned reduction of humidity to be carried out by means of a draught of air with low humidity and at ambient temperature generated by its travelling through a refrigerator evaporator and a condenser, which in virtue of its low humidity is able to dry the surface of the fruits and vegetables with which it comes into contact.

The improved drying tunnel applicable to fruit and vegetables is incorporated in the set of devices which carry out the same function as this, improving their operation due to the lack of air heated by burning coal, diesel fuel, gas or similar, as well as the ones that have resistance to heat up the air draught.

FIELD OF THE INVENTION

This invention has applications in the industry devoted to manufacturing items, devices and systems applicable to horticulture, and fruit cultivation, more specifically in the industry engaged in manufacturing drying tunnels applicable to fruit and vegetables.

BACKGROUND OF THE INVENTION

The need to reduce the surface humidity of the skin of fruit and vegetables produced on these when they undergo a washing process designed to remove dust, earth and similar after being picked and prior to being marketed is well known.

If not removed, the aforementioned humidity could affect their quality, accelerating rotting processes or the growth of fungi or similar on their surfaces.

In order to get rid of the damp on the surface of fruit and vegetables there is a wide variety of drying tunnels on the market, conventionally made from an enclosure which is crossed by these items in a counterflow direction and by a draught of hot air which, due to its temperature, is able to evaporate the humidity, carrying this outside the tunnel along with the draught of air.

The air blast, which is driven by means of blower or suction fans, is heated up by burners which work on fossil fuels such as diesel fuel, gas or coal, as well as by electrical resistance.

The use of fossil fuels causes unwanted residues to be incorporated in the air draught, which can transmit strange smells or flavours, this disadvantage being avoided in some drying tunnels by using heat exchangers or similar which increase the complexity of the ensemble.

The use of electrical resistance for heating the air draught allows the air temperature to be raised to the required level, not incorporating foreign bodies or gases in the products to be dried. Running these is nevertheless more costly than with the tunnels which have solid fuel burners.

In any event, the elimination of the damp in fruits and vegetables by means of hot air is not suitable due to the physical-chemical changes which take place inside said products, reducing their quality and thus, their final price.

Furthermore, the draught of hot air saturated with humidity which emerges from conventional drying tunnels is issued into the environment without any treatment, giving rise to unpleasant smells around the industries which incorporate drying tunnels in their fruit and vegetable drying chains.

The drying tunnels with treatment of the draughts of hot air saturated with humidity substantially increase the operative cost of the process, lowering the competitiveness of the companies which use these.

In view of the problematic existing in this field it would be desirable to have an improved drying tunnel applicable to fruit and vegetables whose operation were not based on the evaporation of water impregnating the surface of the products by hitting these with a blast of hot air, fully preserving their quality.

The applicant is not aware of the existence of any device which has the aforementioned advantage stated as being desirable for a device of this kind.

DESCRIPTION OF THE INVENTION

The improved drying tunnel applicable to fruit and vegetables proposed by the invention constitutes an obvious innovation within its field of application, succeeding in eliminating the surface damp on fruit and vegetables that have previously been subjected to a washing process, by means of hitting these with a draught of dry air at ambient temperature.

Specifically, the invention consists of an outer casing fitted with two independent storeys, which has openings at the ends of the upper floor, which is crossed inside in an upward direction by a conveyor belt which is in turn crossed in a counterflow direction by a particular flow of dry air at ambient temperature, which is able to absorb the humidity on the surface of the products travelling along the belt or similar and which comes from the top floor, blown by means of fans which make this go through a refrigerator evaporator and a condenser.

The refrigerator evaporator and the condenser are located in series on the top floor of the casing, fed by refrigerator compressors, the first achieving a reduction in the humidity of the air draught which crosses this, being cooled at the same time to later go through a condenser which heats this up to ambient temperature, providing a draught of air free of humidity and at a temperature similar to that of the surface of the fruit and vegetables which travel along the conveyor belt.

The draught of air travels through a closed circuit between the upper and lower floor, being loaded with damp on the bottom floor to then go through the previously described system on the upper floor, and once dry and at ambient temperature this returns to the lower floor, driven by means of the previously described electrical fans.

The openings placed at the beginning and end of the conveyor belt's run have air curtains designed to minimise the amount of air escaping outside, with the draught loss being limited to what is generated by friction in the closed circuit.

Air filters are included in the air circuit described above to enable any particles of the products being dried to be eliminated, keeping the air draught free of suspended particles.

The invention is thus an improved drying tunnel applicable to fruit and vegetables, able to dry the surface of these without generating unwanted heating, limiting the emissions into the atmosphere and with a suitable electricity consumption.

DESCRIPTION OF THE DRAWINGS

To complement the description being made and in order to help to understand the characteristics of the invention, a sheet of drawings is adjoined to this descriptive report, as an integral part of the same, in which, for illustrative and not restrictive purposes, the following has been represented.

PREFERRED EMBODIMENT OF THE INVENTION

Figure 1:
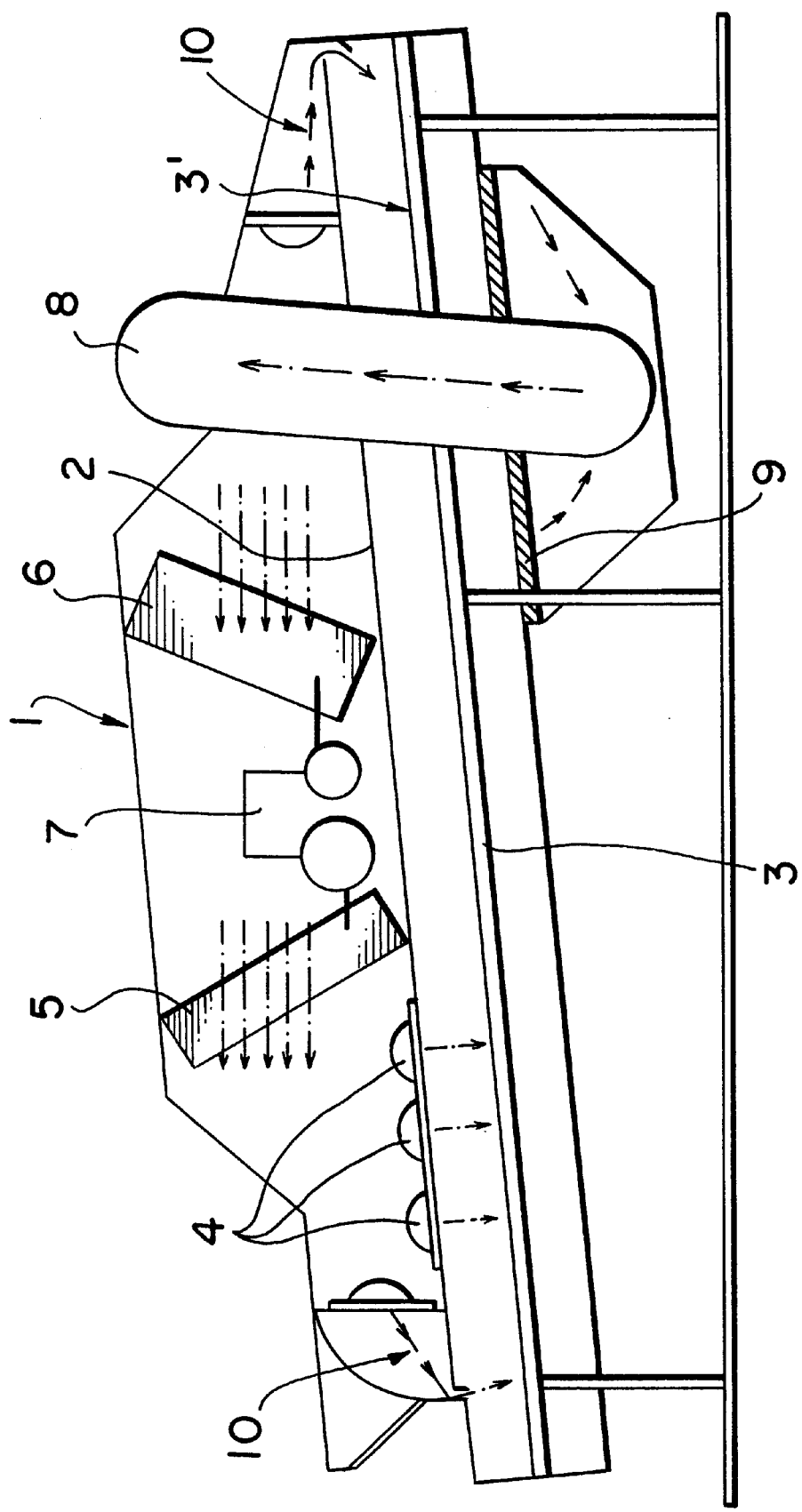
FIG. 1.—This shows a diagram representing a longitudinal section of the invention relative to an improved drying tunnel applicable to fruit and vegetables, the direction of the air draught being shown by means of a dashed line.

In view of the figures it can be seen that the improved drying tunnel applicable to fruit and vegetables being put forward herein consists of an outer casing (1), fitted with a top floor (2) and a bottom floor (3) along which a conveyor belt or similar travels (3'), in an upward direction, limited by air curtains (10).

On the top floor (2) there is a series arrangement of a refrigerator evaporator (6) and a condenser (5), assisted by a cooler compressor (7), fitted with fans (4) located on the surface separating the lower floor (3) and the upper floor (2).

Close to the end of the run of the conveyor belt (3') one can appreciate the presence of a conduit (8) which communicates the upper floor (2) and lower floor (3), there being filters (9) placed transversally to the extension of the conduit (8).

The air draught generated by the fans (4) thus crosses the evaporator (6) and the condenser (5), which reduce the humidity and give this a suitable temperature, later hitting the products which travel on the conveyor belt (3') on the lower floor (3), recirculating to the top floor (2) through the conduit (8), in which filters (9) are placed laterally, preventing any losses through the presence of air curtains (10) at the openings in the end of the conveyor belt's run (3'), by means of which the fruit and vegetable products get in and out.

It is not considered to be necessary to make this description any longer for any expert in the field to be able to understand the scope of the invention and the advantages stemming from this.

The materials, shape, size and arrangement of the items will admit some variation, on condition that this does not mean any alteration to the essential nature of the invention.

The terms in which this report is written should always be taken in the broad and non-limiting sense.

What is claimed is:

1. Improved drying tunnel applicable to fruit and vegetables, characterised in that this consists of an outer casing (1), fitted with an upper floor (2) and a lower floor (3) along which a conveyor belt of similar (3') travels, arranged in an upward direction, limited by means of air curtains (10), with a series arrangement on the top floor (2) of a refrigerator evaporator (6) and a condenser (5), assisted by a refrigerator compressor (7), having fans (4) located on the surface separating the lower floor (3) and upper floor (2), there being, close to the end of the travel of the conveyor belt (3') a conduit (8) which communicates the top floor (2) and bottom floor (2), with filters (9) being set out transversally to the conduit direction (8).

* * * * *

UNITED STATES PATENT AND TRADEMARK OFFICE
CERTIFICATE OF CORRECTION

PATENT NO. : 6,195,913 B1
DATED : March 6, 2001
INVENTOR(S) : Barber, Pedro Morano et al.

It is certified that error appears in the above-identified patent and that said Letters Patent is hereby corrected as shown below:

(75) Inventors: Jaime-<u>Andres</u> Catala Canet; etc.

Signed and Sealed this

Twenty-eighth Day of August, 2001

Attest:

*Nicholas P. Godici*

NICHOLAS P. GODICI
*Attesting Officer*    *Acting Director of the United States Patent and Trademark Office*